United States Patent
Clark et al.

(10) Patent No.: US 6,514,562 B1
(45) Date of Patent: Feb. 4, 2003

(54) CARBON-CARBON FIBER COMPOSITE MATERIALS

(75) Inventors: David Thomas Clark, Frodsham (GB); Julio Joseph Faria, Frodsham (GB); Margaret Lillian Steel, Frodsham (GB)

(73) Assignee: Surface Transforms Ltd., Frodsham (GB)

( * ) Notice: Subject to any disclaimer, the term of this patent is extended or adjusted under 35 U.S.C. 154(b) by 0 days.

(21) Appl. No.: 09/485,607

(22) PCT Filed: Aug. 13, 1998

(86) PCT No.: PCT/GB98/02432

§ 371 (c)(1),
(2), (4) Date: Feb. 11, 2000

(87) PCT Pub. No.: WO99/08980

PCT Pub. Date: Feb. 25, 1999

(30) Foreign Application Priority Data

Aug. 13, 1997 (GB) ............................................... 9717152

(51) Int. Cl.$^7$ ...................... C04B 35/83; C04B 35/573; C04B 41/87; C04B 41/88; F16B 69/02
(52) U.S. Cl. ........................ 427/140; 427/226; 427/228; 427/229; 427/430.1; 427/431; 427/443.2
(58) Field of Search ................................. 427/140, 226, 427/228, 229, 430.1, 431, 443.2; 29/402.18

(56) References Cited

U.S. PATENT DOCUMENTS

| 5,244,623 A | * | 9/1993 | King ........................... 264/510 |
| 5,397,595 A | * | 3/1995 | Carroll et al. ............... 427/228 |
| 5,547,717 A | * | 8/1996 | Scaringella et al. ........ 427/590 |
| 5,554,390 A | * | 9/1996 | Anne et al. .................. 428/631 |
| 5,582,861 A | * | 12/1996 | Schwab et al. .............. 427/140 |

FOREIGN PATENT DOCUMENTS

| DE | 4438456 | 5/1996 |
| EP | 835853 | 4/1998 |
| WO | WO 9718176 | 5/1997 |
| WO | WO-97/22815 A1 | * | 6/1997 |
| WO | WO 972341 | 7/1997 |

* cited by examiner

Primary Examiner—Shrive P. Beck
Assistant Examiner—Michael Cleveland
(74) Attorney, Agent, or Firm—The Firm of Hueschen and Sage

(57) ABSTRACT

Defective, e.g. worn or substandard, carbon-carbon fibre composite materials such as frictional materials in brakes or clutches may be restored and/or upgraded by impregnation with a molten reactive metal source comprising a carbide-forming metal or a derivative thereof such as an oxide.

9 Claims, 1 Drawing Sheet

CARBON-CARBON FIBER COMPOSITE MATERIALS

This invention is concerned with a method for enhancing the properties of carbon-carbon fibre composite materials and structures, more particularly with a method for the restoration and/or upgrading of defective carbon-carbon fibre composites.

Carbon-carbon fibre composite materials and structures, e.g. comprising a matrix of carbon embedded in a carbon fibre structure, are used inter alia as frictional materials in brakes and clutches. In such applications these materials may experience frictional and oxidative wear, leading to loss of both physical dimensions and physical properties such as strength and thermal capacity. As a result of degradation of their physical properties such materials may have to be discarded as defective when only partly worn in terms of their physical dimensions.

Defective or substandard carbon-carbon fibre composites may also result from faulty manufacturing processes or as a result of stresses imposed when used in applications other than as frictional materials. Thus, for example, faulty manufacturing processes often lead to low density products with fine crazing and shrinkage cracks; such materials typically exhibit poor mechanical properties and low thermal conductivity and diffusivity.

Figure 1:
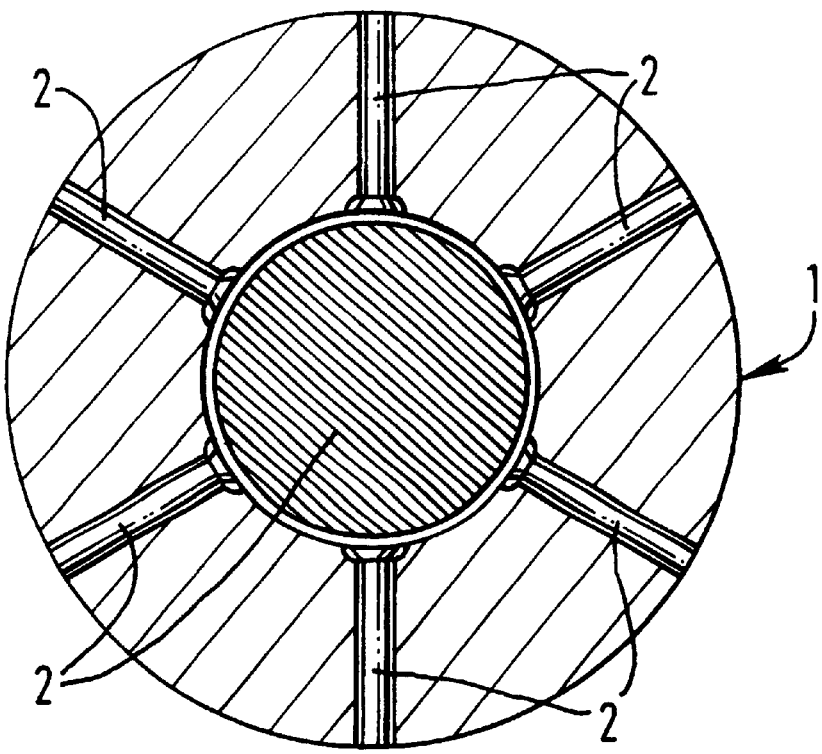
FIG. 1: shows a schematic representation of a carbon-carbon fiber brake sample.

The present invention is based on the unexpected finding that defective carbon-carbon fibre composites may be restored/upgraded by treatment with a molten reactive metal source. Whilst we do not wish to be bound by theoretical considerations, it would appear that such treatment results in intercalation or infiltration of molten reactive metal into pores and interstices within the carbon matrix material and reaction between the metal and the matrix carbon to form metal carbide which reinforces and enhances the properties of the matrix structure, for example restoring or improving physical and frictional properties such as structural strength and specific heat capacity, and/or enhancing chemical properties such as oxidation resistance. The carbon fibre content of the composite, on the other hand, is surprisingly resistant to reaction with the molten reactive metal and remains substantially unchanged throughout the process, so that its own reinforcing function is not compromised.

Thus according to one aspect of the invention there is provided a process for enhancing the properties of defective carbon-carbon fibre composite material which comprises impregnating said material with a molten reactive metal source.

Defective composite materials which may be treated in accordance with the invention include used materials and unused but substandard materials, particularly frictional materials. The process may be employed to restore or upgrade such materials so that they exhibit improved or different properties and may be used in their originally intended applications or in new applications.

In general, the process will lead to formation of metal carbide-containing products, for example comprising a stoichiometric metal carbide or a mix of free metal, metal carbide and residual carbon matrix in appropriate proportions, in each case retaining the original carbon fibre reinforcing structure.

Impregnation of the composite material with molten metal may, for example, be achieved using either surface tension or external pressure to drive the metal into pores and interstices within the carbon matrix. Thus impregnation may be effected either by at least partially immersing the material in a bath of the molten reactive metal source (the molten bath process), or by encapsulating the material together with excess reactive metal source in an evacuated container, and subjecting this container to high temperature and isostatic pressure (the encapsulation process).

The molten bath process is preferably carried out in an inert atmosphere, e.g. under an inert gas such as argon. The bath may be heated by conventional means such as gas or resistive, microwave or inductive electrical heating. The bath may be supported by or be part of an oven of appropriate size. If desired, the sample and reactive metal may independently be heated up to temperatures at or above the melt temperature of the reactive metal source.

In the encapsulation process, on the other hand, the carbon-carbon fibre composite sample is encapsulated together with solid reactive metal source in a sealed container, which is thereafter placed in a hot isostatic press. This specifically designed equipment enables high temperatures and high isostatic pressures to be applied, over controlled time periods, to the container and its contents. An inert gas is usually chosen as the pressurising fluid. The material from which the container is formed is chosen so that it may become ductile at the temperature and pressure required for reaction to proceed in the container; the resulting softening allows the pressure applied to the outside of the container to be transmitted to the contents thereof, effectively forcing molten metal into interstices and pores within the carbon matrix structure.

Reactive metals useful in the process of the invention are metals which may form one or more carbides and which may be contained in a melt vessel or encapsulated by a material of higher melting point. Such metals include those which are themselves refractory, for example metals whose melting point is 1,300° C. or higher. The metal may, for example, be a member of Group III, IV, V or VI of the Mendeléef Periodic Table of Elements, representative examples being shown in the following Table I:

TABLE I

| Metal | Symbol | Melting Point (° C.) | Group of the Mendeléef Periodic Table of Elements |
|---|---|---|---|
| Silicon | Si | 1,420 | IVb |
| Titanium | Ti | 1,850 | IVa |
| Hafnium | Hf | 2,500 | IVa |
| Molybdenum | Mo | 2,500 | VIa |
| Tantalum | Ta | 2,900 | Va |
| Tungsten | W | 2,900–3,000 | VIa |
| Zirconium | Zr | 2,130 | IVa |
| Boron | B | 2,300 | IIIb |

It will be seen that the melting points of these metals fall within the range 1,400° C. to 3,000° C.; most are in the range 1,800° C. to 3,000° C.

As an example for purposes of this invention silicon may be used as the impregnating and reacting metal and the samples may be encapsulated by zirconium or molybdenum. Carbon, which does not melt but sublimes at atmospheric pressure and temperatures in excess of 3,500° C., may also be used as an encapsulating material.

The source of reactive metal may, for example, be the metal itself or a suitable derivative, e.g. an oxide, thereof.

The metal source in encapsulation processes may conveniently be in thin sheet, powder or other finely divided form.

If desired, the reactive metal source may comprise two or more components, for example two or more metals, or may contain one or more additives capable of dissolving in the molten metal or metal alloys.

Carbon-carbon fibre composites for treatment in accordance with the invention may typically have a porosity of at least 10%; in the case of articles which have undergone substantial frictional and/or oxidative stress this may often be in excess of 15%. Whilst it may be advantageous if the pores and interstices form connected voids, it is in practice only necessary for the composite material to have a degree of surface porosity, since infiltrating molten metal will be capable of forming a reaction front which progressively penetrates into the carbon matrix, driven by a combination of chemical reaction forces and physical forces such as surface tension and/or applied pressure.

The following conditions are important to operation of the process:

a) the melt temperature of the reactive metal source;

b) the porosity of the composite material to be treated; and c) the infiltration and reaction times of the reactive metal with the carbon matrix.

For a given matrix material and reactive metal, the infiltration and reaction rates may be varied by controlling the temperature and, where appropriate, pressure applied over a controlled timescale. In the case of a molten bath process, reaction rate and extent of infiltration are primarily controlled by temperature and time. In the case of an encapsulation process, pressure, temperature and time are used as controlling parameters.

A typical hot isostatic pressing procedure comprises placing the encapsulated sample in a pressure vessel adapted to receive a gas at high pressure and also adapted to be heated to a suitable temperature. After the encapsulated sample has been inserted into the vessel, the latter is sealed and the gas pressure and temperature increased at predetermined rates until they reach the operating pressure and operating temperature, at which they are maintained for an operating time sufficient to provide a satisfactory product; it will be appreciated that the operating time is only a portion of the total time during which the encapsulated sample is subjected to superatmospheric pressure. In general terms, the operating pressure is normally at least 500 bar, for example in the range 750 to 2,500 bar, preferably 1,000 to 2,000 bar, and the operating temperature is normally at least 1000° C., for example in the range 1,000° C. to 3,000° C.

Examples of conditions of pressure and temperature which may be used are as follows:

TABLE II

| Metal source | Encapsulating material | Pressure (bar) | Temperature (° C.) |
| --- | --- | --- | --- |
| Silicon | Zirconium | 1,000–2,500 | 1,400–1,850 |
| Silicon | Molybdenum | 1,000–2,500 | 1,400–2,000 |
| Silicon | Tantalum | 1,000–2,500 | 1,400–2,000 |
| Titanium | Molybdenum | 1,000–2,500 | 1,680–2,000 |
| Titanium | Tantalum | 1,000–2,500 | 1,680–2,300 |
| Zirconium | Tantalum | 1,000–2,500 | 1,850–2,300 |
| Boron | Tantalum | 1,000–2,500 | 2,180–2,400 |
| Molybdenum | Tungsten | 1,000–2,500 | 2,600–3,000 |
| Tantalum | Carbon | 1,000–2,500 | 2,950–3,300 |

A particular advantage of the process of the invention is that, in general, the composite material samples do not suffer from undue change of shape during the process, any change in dimensions which does occur generally being isotropic. This feature is known as retention of "near-net shape", and maybe assisted by the fact that the carbon fibre content of the samples remains substantially unchanged throughout the process.

Prior to processing in accordance with the invention, samples such as worn or defective structures may be machined to a desired new shape. The samples may additionaly or alternatively be washed, the use of ultrasonic washing to expose their pore structures being advantageous. If desired, new carbonaceous material may be applied to supplement the carbon matrix prior to the molten metal infiltration process. This may be achieved using carbonisable organic materials such as suitable pitches or thermosettable polymers, for example phenolic or furfuryl resins, e.g. in solution or melt form, or crosslinkable monomers or oligomers, which will be carbonised at temperatures well below the melting point of the molten metal, thus providing extra carbon at the metal infiltration stage.

The invention is illustrated by the following examples in which all temperatures are in degrees Celsius. It will be appreciated that all processing conditions relate to the size and shape of the particular sample, and that larger samples will generally take longer to heat and cool than smaller samples.

EXAMPLE 1

This Example describes the restoration of a used carbon-carbon fibre composite brake by reactively impregnating it with molten silicon using a molten bath process.

A used brake disk was washed and trimmed on a milling machine to remove debris and other surface imperfections and to provide a new friction surface at the required new dimensions. The disk was then ultrasonically washed to expose the open pore structure, dried in a vacuum oven and weighed. The cleaned brake material was then suspended in a high temperature oven over a silicon bath, the oven and bath being blanketed with argon. When the temperature of the disc reached the melting temperature of the silicon it was lowered into the molten silicon bath and held so that it was partly immersed. The weight gain of the disc was then monitored during the impregnation. The rate of impregnation was controlled by the degree of immersion and the temperatures of the molten silicon bath and sample. The bath temperature was varied between 1450° and 1700°.

When the desired weight gain had been achieved the disc was removed from the bath and allowed to cool slowly in an inert atmosphere. If desired the disc may then be further impregnated after cleaning up the surface to remove excess silicon.

Using the process described, a used carbon-carbon fibre brake disc which originally had a carbon matrix:carbon fibre content of 70% and 30% by volume respectively, a density of 1.8 kg/m$^3$ and a calculated porosity of 10% by volume was converted to a material with an average density of 2.45 kg/m$^3$ and a composition of 30% carbon fibre, 46.6% carbon matrix, 11.7% silicon and 11.7% silicon carbide. A weight gain of approximately 20% was recorded.

EXAMPLE 2

This Example describes the recovery of used brake materials by reactive impregnation with molten silicon in an encapsulation process, using a deformable container membrane isostatically to pressurise molten silicon into the pores of the carbon-carbon fibre composite.

Figure 2:
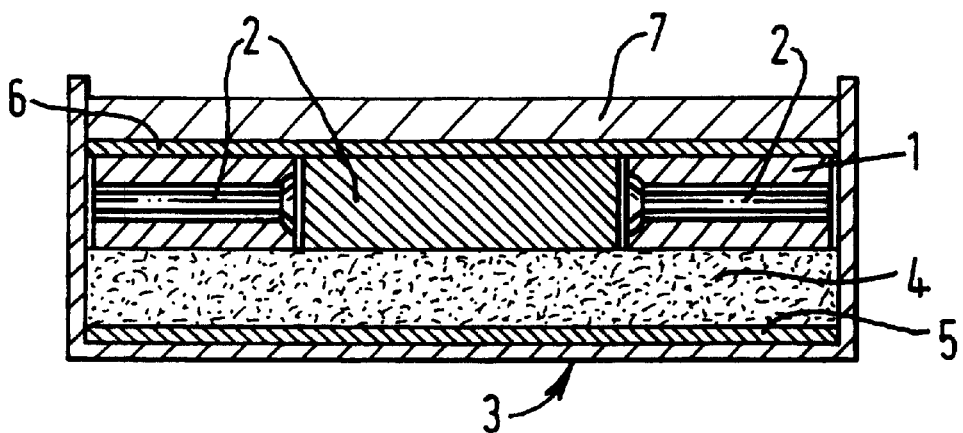
FIG. 2: shows a schematic representation of the container system of the instant invention.

The brake sample was prepared as described in Example 1. Schematic representations of such a brake sample and the container system are shown in FIGS. 1 and 2 of the accompanying drawings.

The brake sample (1) to be treated had a large central hole and a number of radially drilled holes, the latter for cooling purposes. The central hole and the radially drilled holes were fitted with loose fitting plugs (2) to reduce the total amount of non-essential silicon required in the procedure. The plugs were slightly tapered and were made of a non-reactive material such as silicon carbide or non-porous carbon monolith of low reactivity (see FIG. 1).

The brake sample was then placed in a cold drawn lidable can made of molybdenum (3) (see FIG. 2) on top of a consolidated bed of silicon powder (4) which rested on a well-fitting silicon carbide plate (5) in the bottom of the can. The amount of silicon metal was selected to be more than sufficient when melted to impregnate the sample and fill all the interstices between the brake material and the loose fitting plugs. The brake sample was held flush against a top silicon carbide plate (6) by the lid (7) of the can. The can was then sealed under vacuum, using electron beam welding and taking due care to exclude air from the can.

The canned brake sample was then placed in a hot isostatic press where it was subjected to a range of controlled temperature and isostatic pressure conditions. The temperature of the sample and the essential isostatic pressure on the sample were raised to 1450° and 1000 bar over 2 hours.

During this time the silicon melted and the low viscosity, high surface tension molten metal started to penetrate the interstices and pores of the brake sample, at the same time reacting with the available matrix carbon. As a result of a 9.5%. reduction in volume of the silicon on melting and the filling of interstices between the plugs and the brake sample, the overall volume of the components inside the can was reduced. Since molybdenum is soft and ductile at the operating temperature, the can collapsed around its contents as a sealed flexible envelope, thus allowing the external isostatic pressure to be exerted on the molten silicon.

In order to enhance this effect and the reaction rate of molten silicon with the matrix carbon, the temperature and external isostatic pressure on the sample were then slowly raised over 4 hours to 1650° and 2000 bar, during which time the molybdenum can further deformed around the sample and pressurised the liquid silicon further into the pores so that it could impregnate and react with previously unavailable matrix carbon.

The sample was then allowed to cool slowly to 1200° over 4 hours at 2000 bar, whereafter both temperature and pressure were reduced over 3 to 4 hours to room temperature and pressure.

The treated brake sample was then removed and decanned. The original loose fitting plugs were then pressed or machined out and the treated brake sample was dressed and trimmed to remove artifacts and excess silicon and to prepare a good friction surface.

Using the process described, a used carbon-carbon fibre brake disc which originally had a carbon-carbon matrix:carbon fibre content of 70% and 30% by volume respectively, a density of 1.8 kg/m$^3$ and a calculated porosity of 10% by volume was converted to a material with an average density of 2.40 kg/m$^3$ and a composition of 30% carbon fibre, 23.3% carbon matrix, 15.6% silicon and 31.1% silicon carbide. A weight gain of approximately 33% was recorded.

What is claimed is:

1. A process for enhancing the properties of used carbon-carbon fibre composite material which comprises impregnating said material with a molten carbide-forming metal or oxide thereof.

2. A process as claimed in claim 1 wherein the carbide-forming metal is a member of group III, IV, V or VI of the Mendeleef Periodic Table of Elements.

3. A process as claimed in claim 2 wherein the carbide-forming metal is silicon.

4. A process as claimed in claim 1 wherein impregnation is effected by at least partially immersing the carbon-carbon fibre composite material in a bath containing the molten carbide-forming metal or oxide thereof.

5. A process as claimed in claim 1 wherein impregnation is effected by subjecting the carbon-carbon fibre composite material and the carbide-forming metal or oxide thereof to hot isostatic pressing at a temperature exceeding the melting temperature of the carbide-forming metal or oxide.

6. A process as claimed in claim 1 wherein the carbon-carbon fibre composite material comprises worn frictional material.

7. A process as claimed in claim 1 wherein the carbon-carbon fibre composite material is machined to a desired shape prior to impregnation.

8. A process as claimed in claim 1 wherein the carbon-carbon fibre composite material is subjected to ultrasonic washing prior to impregnation.

9. A process as claimed in claim 1 wherein carbonisable organic material is applied to the carbon-carbon fibre composite material prior to impregnation.

* * * * *